July 2, 1968 V. L. RUBY 3,390,493
COLLAPSIBLE SHELTER
Filed June 13, 1966 4 Sheets-Sheet 1
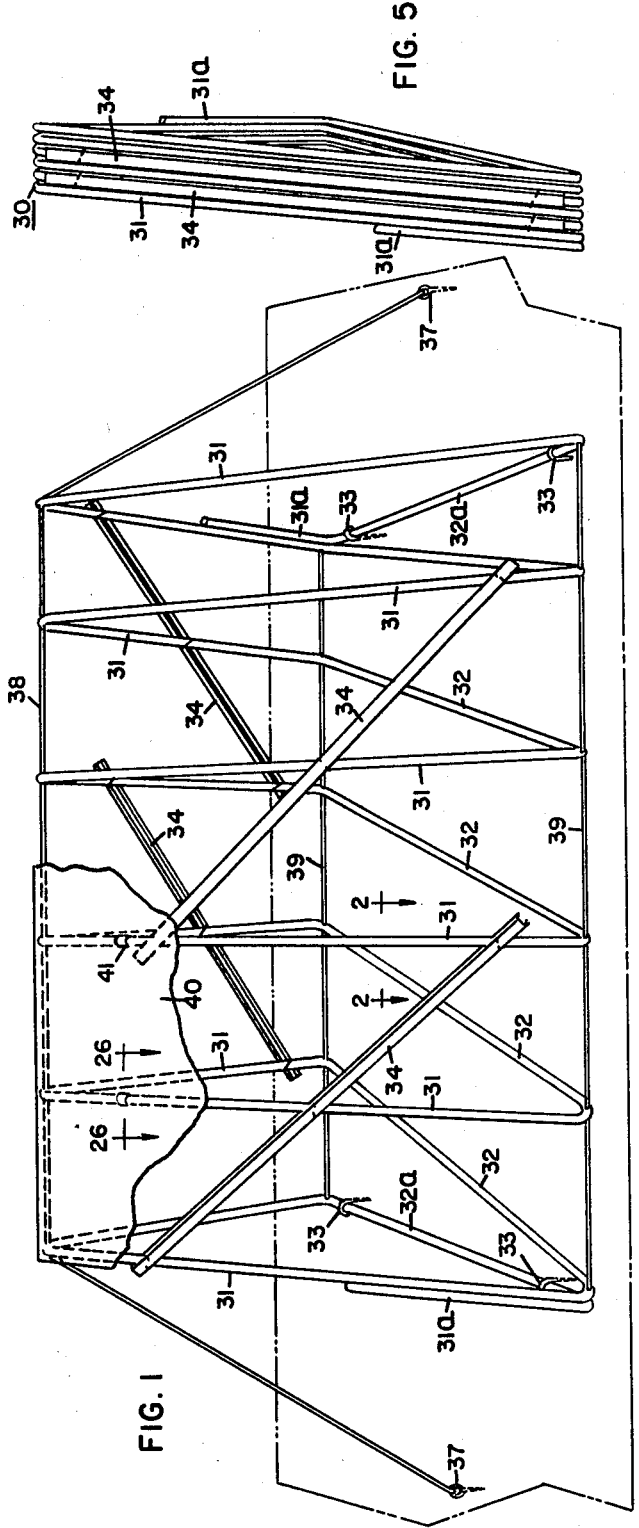
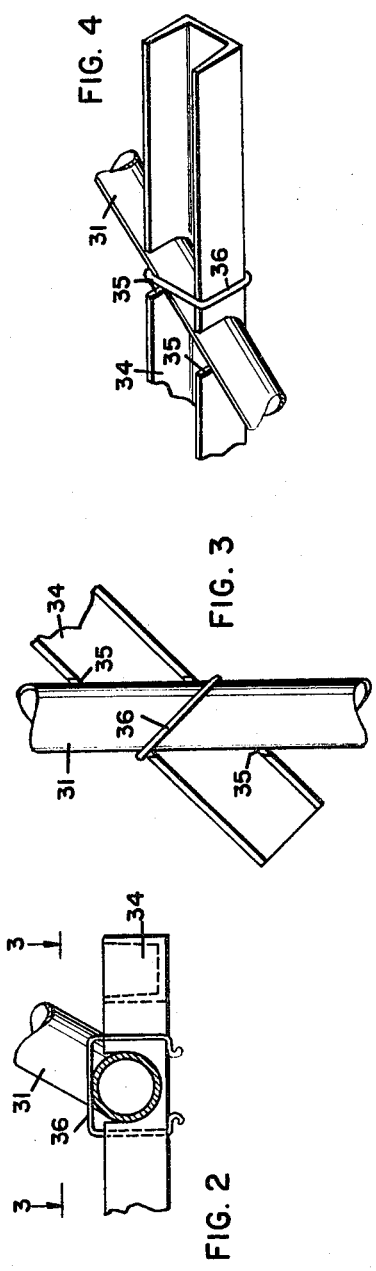
INVENTOR
VICTOR L. RUBY
BY
Walter B. Udell
ATTORNEY.

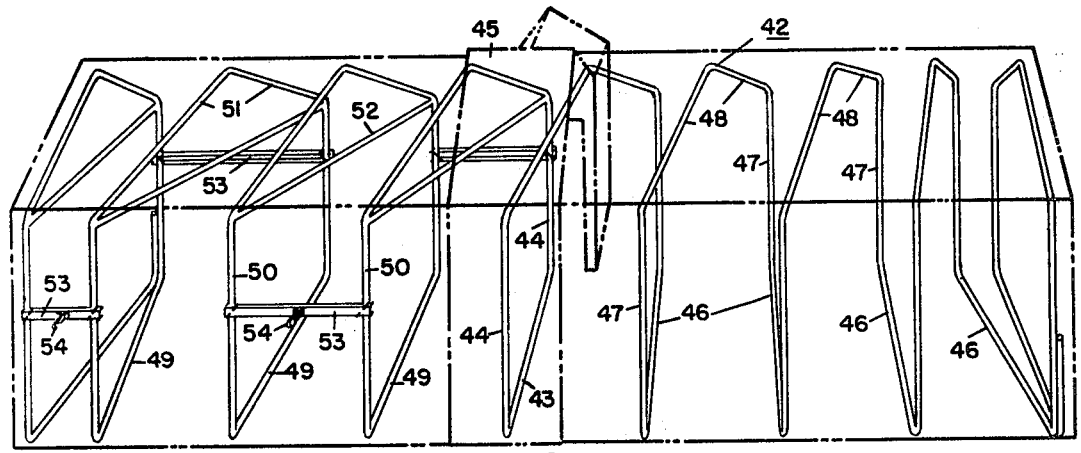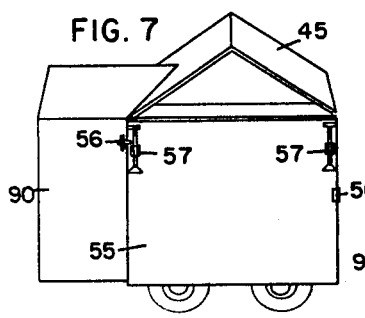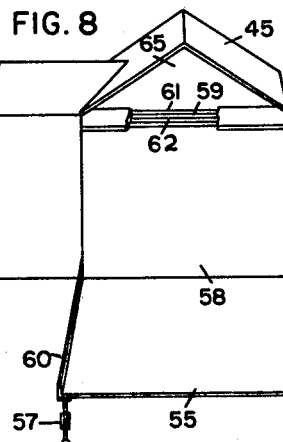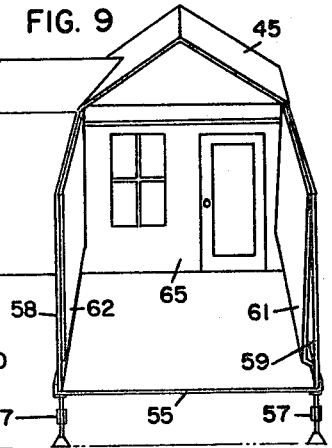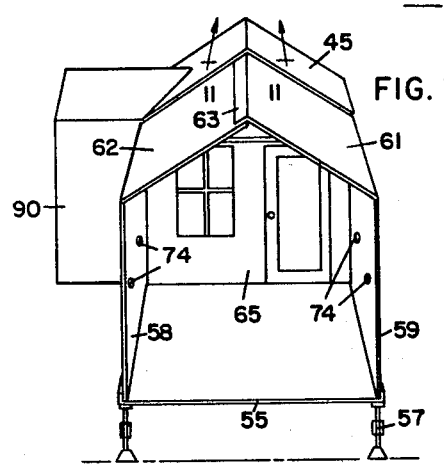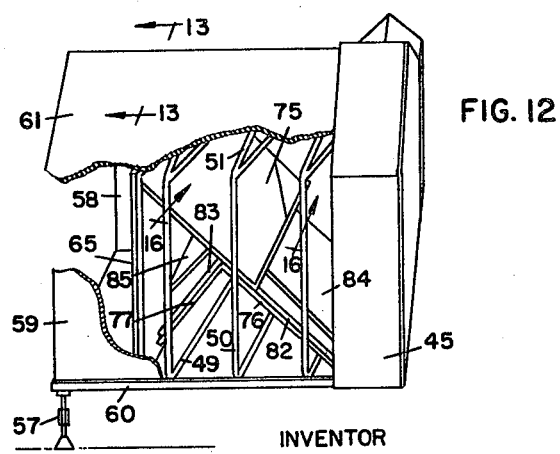

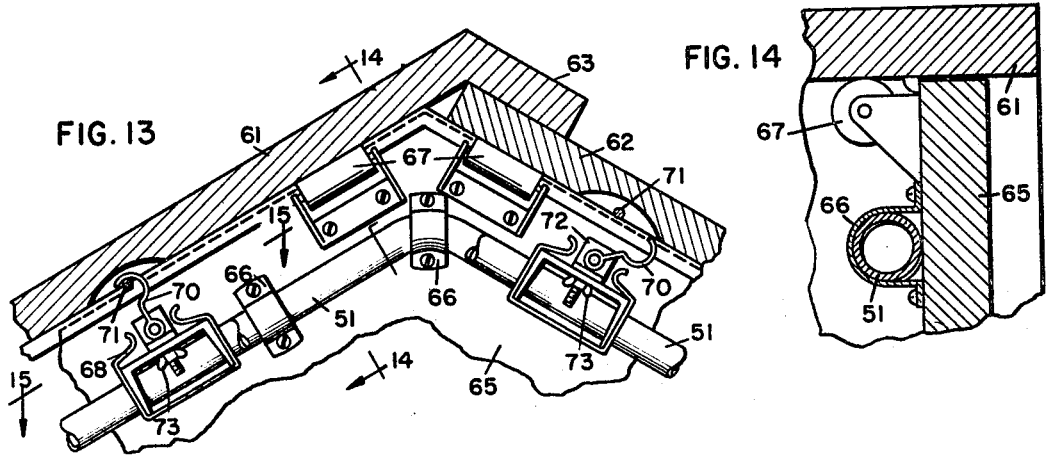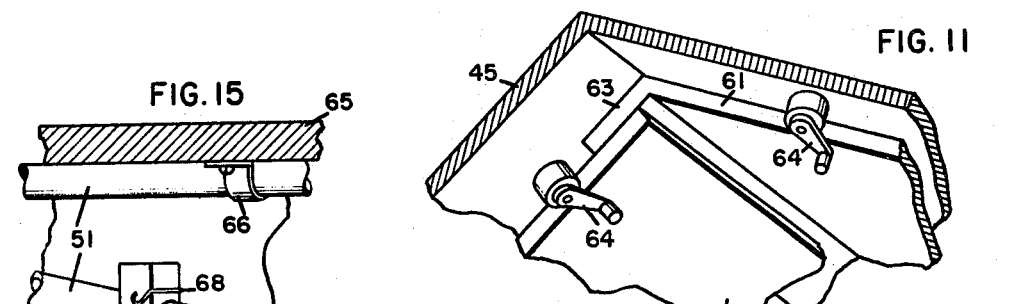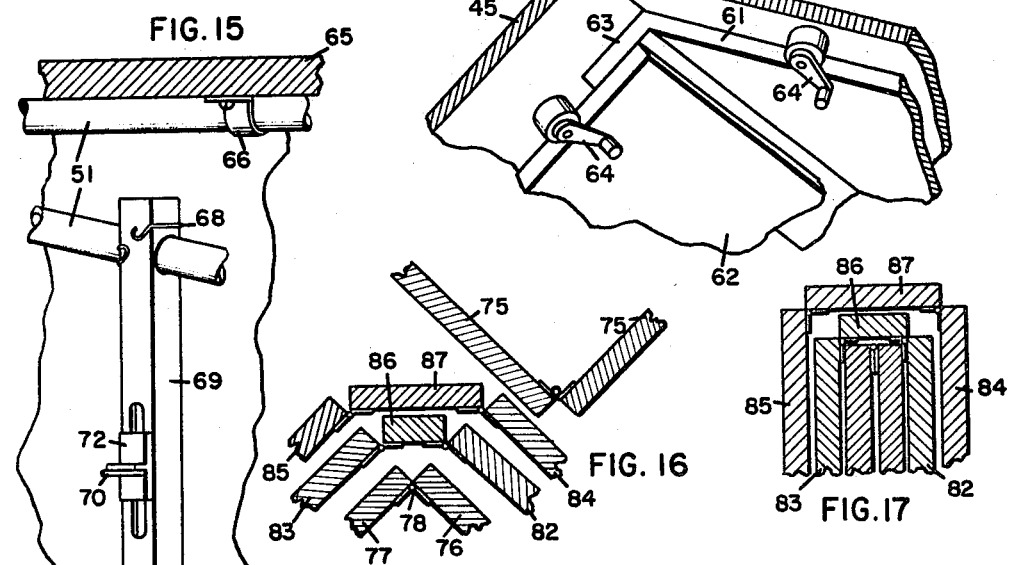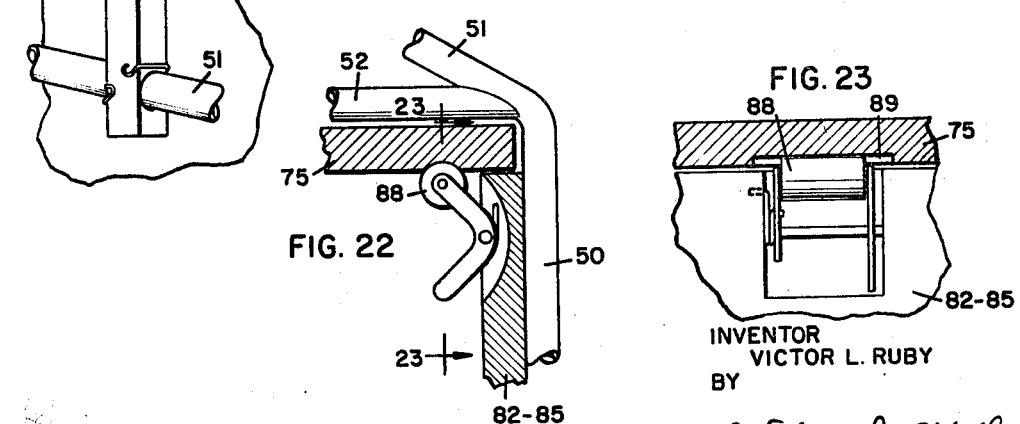

July 2, 1968  V. L. RUBY  3,390,493
COLLAPSIBLE SHELTER
Filed June 13, 1966  4 Sheets-Sheet 4
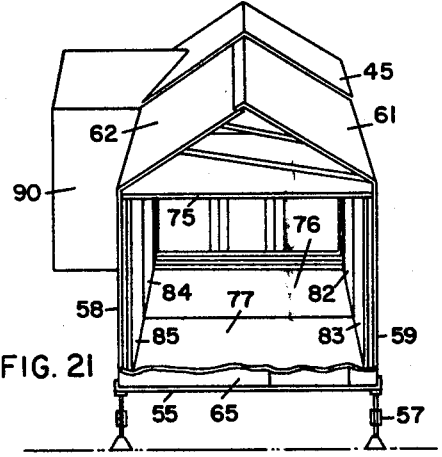
FIG. 21
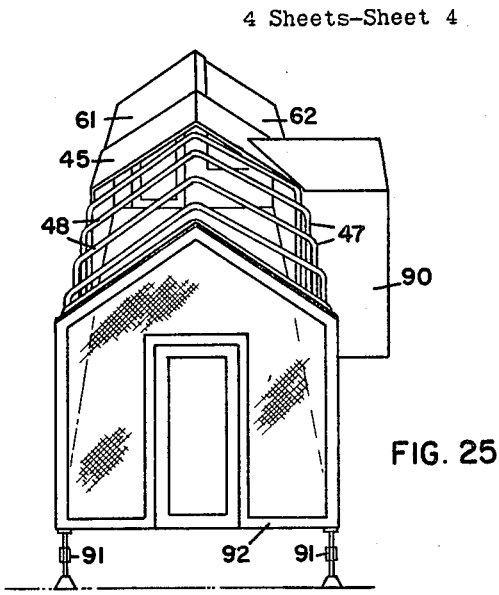
FIG. 25
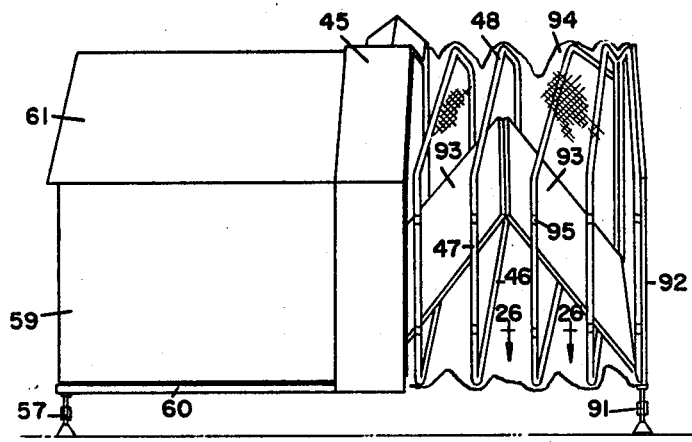
FIG. 24
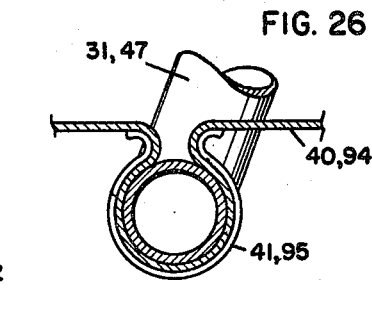
FIG. 26
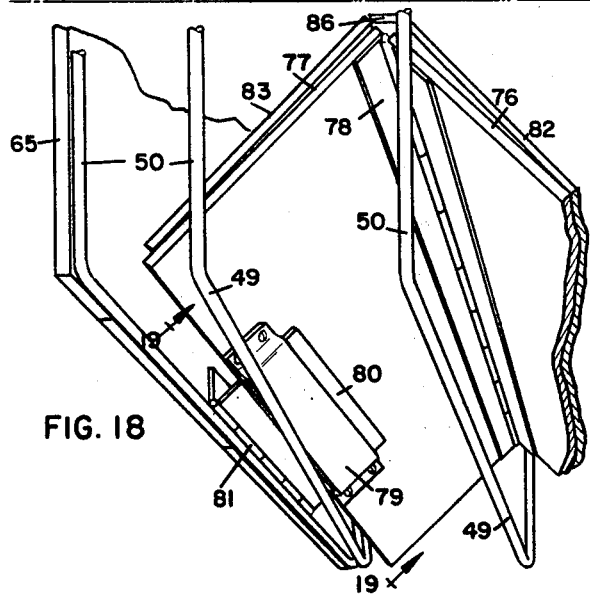
FIG. 18
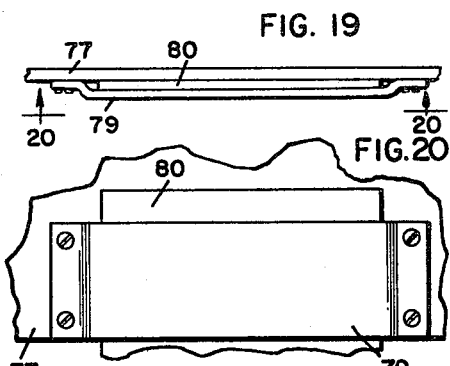
FIG. 19
FIG. 20
INVENTOR
VICTOR L. RUBY
BY
Walter B. Udell
ATTORNEY.

United States Patent Office 3,390,493
Patented July 2, 1968

3,390,493
COLLAPSIBLE SHELTER
Victor L. Ruby, 3939 Ednor Road,
Baltimore, Md. 21218
Filed June 13, 1966, Ser. No. 557,215
15 Claims. (Cl. 52—63)

ABSTRACT OF THE DISCLOSURE

Compact collapsible self-contained shelters formed from an axially expandible and collapsible helically coiled resilient main structural support element together with means for rigidifying the axially expanded coil to provide a strong structural frame. In use the helical axis is oriented substantially horizontally. In one form, the basic frame structure is used in combination with flexible covering materials to form an internally braced tent-like enclosure, while in another form the fully erected structure is provided with walls, floor and roof made from rigid panels to form an all weather enclosure. The collapsible shelter may be carried car-top or held in a trailer which is relatively small compared to a house trailer, but which contains a shelter of substantially larger size than a house trailer when the shelter is opened out for use.

This invention relates generally to collapsible shelters which are quickly and easily erected from a very compact package which is readily transportable. The collapsible shelters according to the invention are useful not only for traveling and camping, but also as semi-permanent structures such as construction tool sheds and field offices which may be quickly and easily set up on a job for a specific period of time and then collapsed and moved to the next construction site. Accordingly, it is a primary object of my invention to provide collapsible shelters embodying the aforesaid structural and functional details.

Another object of my invention is to provide a novel collapsible shelter utilizing a helically coiled main structural supporting member axially expandable and contractible with the orientation of the coiled axis parallel to the ground or other underlying support surface.

A further object of my invention is to provide a novel collapsible shelter in which the helically coiled main support structure consists of tubing material having the turns of the coil normally disposed against one another in substantially unstressed condition and with all coil turns of substantially the same size and configuration in any given region of the set-up shelter where it is desired to have a uniform vertical cross section through the shelter.

The foregoing and other objects of my invention will become clear from a reading of the following specification in conjunction with an examination of the appended drawings wherein:

FIGURE 1 is a perspective view of one form of a collapsible shelter according to the invention showing the helically coiled main support member in its expanded state and rigidized by means of side bracing elements;

FIGURE 2 is a cross-sectional view on an enlarged scale through a part of the structural coil shown in FIGURE 1 and illustrating a detail of the brace securement;

FIGURE 3 is a view as would be seen when viewed along the line 3—3 of FIGURE 2;

FIGURE 4 is a perspective showing of the plan view illustration of FIGURE 3;

FIGURE 5 illustrates the helically coiled main structural support member of FIGURE 1 in its axially contracted condition and with the side braces carried thereby in storage position;

FIGURE 6 illustrates another form of the helically coiled main supporting structure shown in conjunction with a phantom view of a trailer device into which the entire main structure is collapsible and illustrating one bracing aspect for a specific form of structure;

FIGURES 7 through 10, 12 and 21 illustrate a trailer contained semi-permanent type of structure in progressive stages of set-up;

FIGURES 11, 13 through 20, 22 and 23 illustrate structural details utilized in the semi-permanent structure shown in progressive stages of set-up in the FIGURES 7 through 10, 12 and 21;

FIGURES 24 and 25 illustrate the expansion into opened out form of a second section of trailer contained structure which may be also opened out and utilized as desired; and FIGURE 26 illustrates a fragmentary detail on an enlarged scale of clips for securing a flexible protective covering in position on the expanded coil of the main support structure, as would be seen when viewed along the line 26–26 of FIGURES 1 and 24.

In the several figures, like elements are denoted by like reference characters.

Turning now to the figures and considering first FIGURES 1 through 5, it is observed that a conventionally triangularly shaped cross section tent type of structure is constructed from a helically wound coil designated generally as 30 in which each coil loop is of triangular shape having diagonal side legs 31 and bottom legs 32. The bottom legs 32a of the end loops may be made somewhat shorter than the intermediate bottom legs 32 as would be required by the expansion geometry of the coil if important to maintain constant cross section at the ends.

As best seen from FIGURE 2, the coil is made of generally circular cross section tubular material preferably of a lightweight metal such as aluminum, but which might also be made of some suitable plastic materials having sufficient structural strength such as reinforced nylon. In production, the coil is made by winding the tubular material about a suitably shaped coil form, or by using a rotating mandrel of proper shape and dimensions. When a coil of the desired number of turns has been formed, the coil is cut off and the short ends 31a are fused to their immediately adjacent full side legs 31 in any convenient manner, as for example by welding, riveting or otherwise, the legs 31a being preferably one third to one half of the length of full side leg 31.

In setting up the structure of FIGURE 1, the coil 30 is first partially expanded so that a pair of locking stakes 33 may be used to secure one of the end bottom legs 32a to the ground. Next, the coil is expanded so that the channel side braces 34 may be secured to an adjacent group of three side legs 31. As best seen in FIGURES 2, 3 and 4, each of the channel side braces 34 has its side legs arcuately punched out with longitudinally offset openings 35 sufficient to just accept the outer diameter of the coil tubing. The longitudinal offset of the openings 35 on the side braces 34 establishes the spacing between adjacent side legs 31 of the coil, larger degrees of offset requiring greater leg separation in order to permit disposition of the legs into the offset openings. The side braces 34 are latched to the side legs 31 by means of spring clips 36, and it will be noted that the interior spacing between the side walls of the channel side braces 34 need only be sufficient to accept the outside diameter of the coil side legs 31 so that the side braces may be secured to the side legs by the spring clips 36 in the storage condition as shown in FIGURE 5. With the four braces 34 secured to the coil side legs as shown in FIGURE 1, it is clear that the structure is completely rigidized and exhibits no tendency toward axial movement by any of the coil turns.

The remaining pair of locking stakes 33 are now used to anchor the other bottom leg 32a to the ground and the ridge stakes 37 are placed to secure the opposite ends of the flexible ridge cable or rope 38. Although not essential, side cables 39 may also be employed if desired to further stabilize the ground engaging apices of the triangular turns of the coil 30. The expanded coil 30 may now be quickly and easily enclosed with a filexible covering 40 which is securable to the coil by means of clips 41, a detail of which may be seen in FIGURE 26. From the foregoing it will be apparent that a tent structure of this nature may be erected and dismantled very quickly and easily and provides a much more substantial shelter than the conventional type of tent. It will also be appreciated that the triangular cross sectional shape of the coil 30 and resulting shelter of FIGURE 1 is not mandatory and in fact any desired type of coil shape may be employed. In this regard a different type of coil formation is shown in FIGURE 6 to which reference should be now made.

In FIGURE 6 there is shown an extended coil 42 having a central bottom leg 43 and a pair of opposite central side legs 44 which are fixedly secured within the trailer housing 45 shown in phantom in FIGURE 6 but in solid line showing in FIGURES 7 through 12 and others. As shown, the coil 42 is axially expandable out of the trailer housing 45 in opposite directions, and as will be subsequently seen each coil half may be utilized independently of the other half or both may be used together as desired. The turns of coil 42 which extend to the right as seen in FIGURE 6 have bottom legs designated 46, side legs designated 47 and peak forming legs designated as 48. Extending in the opposite direction toward the left, the coil is formed with bottom legs 49, side legs 50, peak legs 51 and transversely extending ceiling struts 52 which tie together the upper ends of opposite side legs 50 at the points where the latter join the lower ends of the peak legs 51. The side legs 50 are rigidized by means of side braces 53 formed of channel stock in the same manner as that previously described for the braces 34 shown in FIGURES 1 to 5. Each of the side braces 53 carries a locking hook 54 by means of which the extended coil is locked to the outer side wall panels of the semi-permanent shelter structure to be now described in connection with the showings of FIGURE 10.

Referring now to FIGURE 7 it is observed that the trailer housing 45 has a side wall panel 55 secured in upright position to close the side of the trailer by means of latches 56. The side panel 55 carries a pair of levelling jacks 57 and in fact forms the floor of the shelter section to be now described. To set up the shelter, the trailer side panel 55 is unlatched and dropped, being then levelled with the jacks 57. The outer side walls 58 and 59 which are hinged at their vertically extending side edges inside the trailer housing 45 are next swung open as shown in FIGURE 9 with their lower side edges abutting against the side angles 60 carried by the floor panel 55.

The roof panels 61 and 62 hinged respectively to the upper horizontally extending edges of the outer walls 59 and 58 are swung upward into position as shown in FIGURE 10 with the weather lip 63 of roof panel 61 overlapping the upper edge of roof panel 62. As best seen from FIGURE 11, the roof panels 61 and 62 are secured at their inner ends within the trailer housing 45 by the locking arms 64. The shelter front wall 65 is now moved outward out of the trailer housing 45 as shown in FIGURES 10 and 12, drawing with it the coil 42 which has its endmost loop fixedly secured to the rear face of the front wall 65 as by means of the saddle clips 66 which are clearly seen in FIGURES 13, 14 and 15. As also best seen in FIGURES 13 and 14, the rear face of the front wall 65 has secured thereto proximate the peak a pair of rollers 67 which rollingly engage the under-surfaces of the roof panels 61 and 62 to bearingly support the latter as the front wall 65 is moved outward toward its end position.

As best seen in FIGURES 13 and 15, the coil peak legs 51 have secured thereto by means of clips 68 a number of latching channel braces 69 carrying a positionally adjustable latching hook 70 swingable into locking engagement behind each of the pins 71 set into the roof panels 61 and 62. The latching hooks 70 are carried on slide bars 72 lockable in a proprely adjusted position by means of the wing nuts 73. The hook carrying channel braces 69 are the same as the hook carrying side braces 53 shown in FIGURE 6 but not previously described in any detail. The hooks 54 of the side braces 53 are lockable behind the anchor pins 74 set into the outer wall panels 58 and 59, these anchor pins being seen in the showing of FIGURE 10.

As best seen from the showings of FIGURES 12 and 16 through 21, as the front wall 65 is moved forward it carries with it and unfolds a number of other panels which form an inside ceiling, floor and side walls. The ceiling panels 75 are hinged together at their centers and at the forward and rear edges where they are secured respectively to the front wall 65 and inside the trailer housing 45, these panels swinging from a vertical storage position into an opened out upward horizontal plane in the manner shown in final position in FIGURE 21.

The rear and front floor panels 76 and 77 are horizontally hinged together as at 78 and are of unequal length, the panel 76 being longer than the panel 77 so that the hinging point 78 is forwardly offset with respect to the center hinge of the ceiling panels 75. This arrangement is necessary in any case where it is desired that the longitudinal extent of the shelter be greater than the inside floor to ceiling height. Otherwise, when the shelter is being folded up, the downwardly moving ceiling panels will engage the upwardly moving floor and side wall panels and prevent the structure from being compacted. The rear end of floor panel 76 is hingedly secured within the trailer housing 45 while the forward end of the floor panels 77 must be free to move with respect to the front wall 65 due to the difference in length between the floor panels. Captive sliding securement of the front floor panel 77 is effected by means of a bracket 79 fixedly secured to the underside of the floor panel 77 at the leading edge thereof, and through which rides the tongue 80 hingedly fixed to the lower end of the rear face of the front wall 65.

Overlying the floor panels 76 and 77 are the opposite interior side walls having front and rear panels pivotally secured to the floor panels along the side edges thereof. The rear and front panels 82 and 83 of the inner side wall proximate to the outer wall 59 directly overlie the floor panels, while the rear and front panels 84 and 85 of the side wall proximate to the outer wall 58 overlap the first side wall panels. As best seen in FIGURES 16 and 17 the inner side panels 82 and 83 are hingedly connected together by an intervening spacer strip 86, and the inner side wall panels 84 and 85 are similarly hingedly interconnected by the spacer strip 87, the spacers 87 and 86 being required in order to permit fold-up of the interior side walls and floor panels in the manner shown in FIGURE 17 when the shelter is compacted for storage.

With the floor panels down and the ceiling panels up, the overlying interior side wall panels 84 and 85 are turned upward about their lower floor pivots until they assume a vertical position as shown in the detail of FIGURE 22. Spring loaded rollers 88 carried by the wall panels 82 through 85 proximate the upper ends of the latter engage and roll across the undersurface of the ceiling panels 75 until they drop into detent grooves 89 formed in the undersurface of the ceiling panels 75 when the wall panels are in their proper vertically aligned positions. The rollers 88 will normally be sufficient to maintain the interior wall panels in the desired positions, however, auxiliary latches can be employed if considered necessary. The completed structure is seen to be substantially weathertight because of the double wall and ceiling construction, thereby making it suitable for use in inclement weather and in regions not necessarily limited to mild temperatures. Cooking facilities and foldable furniture for use in the shelter may be carried in the forward portion of the trailer, this section being designated in the drawings as 90.

Turning now finally to the showings of FIGURES 24 and 25 it is observed that the coil structure shown therein is axially expandable in precisely the same manner as has already been previously described in connection with the showings of FIGURES 1 through 5, and while not shown, it is intended that channel braces be utilized in rigidizing this structure in exactly the same manner as has been illustrated utilizing the channel side braces 34. The additional features shown in the structure of FIGURES 24 and 25 are the use of the leveling jacks 91 utilized in the same manner as the previously described levelling jacks 57, and the weatherproof front wall 92 which forms the remaining side wall of the trailer housing 45 when the shelter is compacted. Additionally, a floor formed of two panels 93 and hinged at the center is provided so that the floor panels 93 fold downward into horizontal form and seat downward upon the coil bottom legs 46 when this section of the shelter is opened for use. Additional floor panels could be utilized with a coil of greater expandability to form a larger shelter. The shelter is completed by an enclosing flexible covering 94 secured to the coil support structure by clips 95, again in the manner previously described for the shelter of FIGURE 1. The flexible covering 94 may be opaque, translucent, transparent or made in combinations of such to provide for example a translucent ceiling to admit light combined with opaque side walls having transparent sections therein for visibility.

The coils 30 and 42 will in most cases be wound in contracted form so that when expanded there is a bias operative to aid in compacting the coil when it is desired to collapse the shelter. However, where relatively long axial expansions are desired, the coil may be wound in a partly expanded condition in order to reduce the opening force required for complete expansion. Of course, in such a case it will be necessary to also exert a certain compacting force on the coil in order to bottom the coil turns against one another.

Having now described my invention in connection with particularly illustrated embodiments thereof, it will be appreciated that modifications and variations of my invention may now occur from time to time to those persons normally skilled in the art without departing from the essential scope or spirit of the invention, and accordingly it is intended to claim the same broadly as well as specifically as indicated by the appended claims.

What is claimed as new and useful is:

1. A collapsible shelter comprising in combination,
   (a) a main structural frame comprising a continuous coil of tubular material generated about an axis intended in use to be substantially horizontally oriented, with the turns of said coil being of the same size and shape within any section of the shelter intended to have the same vertical cross-sectional shape and area, said coil being rectilinearly expandible for use and contractible for storage along said axis to substantially form cylinders when expanded and contracted with the coil turns disposed immediately adjacent to one another in contracted form,
   (b) a plurality of rigid bracing members each positionable transversely to a plurality of adjacent turns of said coil and detachably fixedly secured to each of said adjacent coil turns substantially within the plane of the cylindrical surface of the expanded coil to thereby rigidify and mechanically stabilize the expanded coil,
   (c) means carried by said bracing members engageable with said coil turns operative to automatically cause adjacent turns of said coil to which said bracing members are secured to assume a predetermined fixed spacing therebetween, whereby the expanded length of said coil is uniformly repeatably obtainable, and
   (d) a repetitively foldable and unfoldable weather resistant covering for said structural frame coil and means for securing said covering to said coil.

2. A collapsible shelter as described in claim 1 wherein each coil turn includes a straight section which functions as a bottom leg disposable horizontally over an underlying support surface and also includes upwardly extending opposite side legs and top bridging portions therefor which support the aforesaid covering for said structural frame coil.

3. A collapsible shelter as described in claim 1 wherein each coil turn includes a straight section which functions as a bottom leg disposable horizontally over an underlying support surface and also includes upwardly extending opposite side legs and top bridging portions therefor which support the aforesaid covering for said structural frame coil, and further including anchor means for removably fixedly securing the opposite end bottom legs and the opposite end top bridging portions to the underlying support surface.

4. A collapsible shelter as described in claim 1 wherein each coil turn includes a straight section which functions as a bottom leg disposable horizontally over an underlying support surface and also includes upwardly extending opposite side legs and top bridging portions therefor which support the aforesaid covering for said structural frame coil, and rigid flooring panel means hingedly coupled by hinging means to at least one end of said main structural frame proximate to one end bottom leg of said coil, said panel means being swingable upward about said hinging means for disposition within the coil interior in a plane transverse to the coil axis when said coil is compacted for storage of said shelter, and said panel means being disposable in a horizontal plane flatwise closely overlying said coil bottom legs when said coil is extended for use.

5. A collapsible shelter as described in claim 4 wherein said shelter is contained within a wheeled trailer housing, said structural frame coil being compacted within said trailer with the coil axis substantially parallel to the axis of rotation of the trailer wheels, and further including lavelling means carried by said housing effective to level the axis of said coil to a horizontal position.

6. A collapsible shelter as described in claim 1 wherein each coil turn includes a straight section which functions as a bottom leg disposable horizontally over an underlying support surface and also includes upwardly extending opposite side legs and top bridging portions therefor which support the aforesaid covering for said structural frame coil, and rigid flooring panel means hingedly coupled by hinging means to at least one end of said main structural frame proximate to one end bottom leg of said coil, said panel means being swingable upward about said hinging means for disposition within the coil interior in a plane transverse to the coil axis when said coil is compacted for storage of said shelter, and said panel means being disposable in a horizontal plane flatwise closely overlying said coil bottom legs when said coil is extended for use, said flooring panel means including a plurality of panels hingedly coupled together along hinging lines extending transversely to the axis of said coil.

7. A collapsible shelter as described in claim 1 wherein said shelter in collapsed form is contained within a housing having at least one outer closure member movable with respect to said housing so that said structural frame coil may be expanded axially out of said housing to set up said shelter, said weather resistant covering within said housing including:
   (a) a shelter vertical front wall secured to the end of said coil which moves out of said housing when said coil is axially expanded,
   (b) a pair of opposite outer sidewall sections and a roof structure disposable in parallel vertically extending layers adjacent to one another and immediately outwardly in front of said vertical front wall when said shelter is compacted within said housing, said sidewall sections and roof structure being swingable respectively outward and upward to form a shelter shell having an open front end, said shelter front wall being movable outward through said shell to close the open front end thereof while said coil expands axially through said shell.

8. A collapsible shelter as described in claim 7 wherein said means for securing said weather resistant covering to said coil include latching means carried partly by said outer sidewall sections and roof structure on the one hand and partly carried by said coil on the other hand.

9. A collapsible shelter as described in claim 7 wherein said means for securing said weather resistant covering to said coil include latching means carried partly by said outer sidewall sections and roof structure on the one hand and partly carried by said rigid bracing members detachably fixedly secured to said coil turns on the other hand.

10. A collapsible shelter as described in claim 9 further including a floor structure and a pair of opposite interior sidewall sections and a ceiling structure disposable in parallel vertically extending layers adjacent to one another within the turns of said coil with their planes substantially at right angles to the coil axis when said coil is compacted within said housing, said floor structure on the one hand and sidewall sections and ceiling structure on the other hand being swingable respectively downward and upward when said coil expands outward through said shelter shell.

11. A collapsible shelter as described in claim 10 wherein said shelter housing is provided with vehicle wheels and is in the form of a trailer, said structural frame coil being compacted within said trailer with the coil axis substantially parallel to the axis of rotation of the trailer wheels, and further including levelling means carried by said housing effective to level the axis of said coil to a horizontal position.

12. A collapsible shelter as described in claim 7 further including a floor structure and a pair of opposite interior sidewall sections and a ceiling structure disposable in parallel vertically extending layers adjacent to one another within the returns of said coil with their planes substantially at right angles to the coil axis when said coil is compacted within said housing, said floor structure on the one hand and sidewall sections and ceiling structure on the other hand being swingable respectively downward and upward when said coil expands outward through said shelter shell.

13. A collapsible shelter as described in claim 12 wherein said shelter housing is provided with vehicle wheels and is in the form of a trailer, said structural frame coil being compacted within said trailer with the coil axis substantially parallel to the axis of rotation of the trailer wheels, and further including levelling means carried by said housing effective to level the axis of said coil to a horizontal position.

14. A collapsible shelter as described in claim 7 wherein each coil turn includes a straight section which functions as a bottom leg disposable horizontally over an underlying support surface and also includes upwardly extending opposite side legs and top bridging portions therefor which support the aforesaid covering for said structural frame coil, and rigid flooring panel means hingedly coupled by hinging means to at least one end of said main structural frame proximate to one end bottom leg of said coil, said panel means being swingable upward about said hinging means for disposition within the coil interior in a plane transverse to the coil axis when said coil is compacted for storage of said shelter, and said panel means being disposable in a horizontal plane flatwise closely overlying said coil bottom legs when said coil is extended for use.

15. A collapsible shelter as described in claim 7 wherein said shelter housing is provided with vehicle wheels and is in the form of a trailer, said structural frame coil being compacted within said trailer with the coil axis substantially parallel to the axis of rotation of the trailer wheels, and further including levelling means carried by said housing effective to level the axis of said coil to a horizontal position.

References Cited
UNITED STATES PATENTS

| | | | |
|---|---|---|---|
| 1,511,334 | 10/1924 | Havemeyer | 52—646 XR |
| 2,828,755 | 4/1958 | Stockman | 135—4 XR |
| 3,155,419 | 11/1964 | Garson et al. | 52—71 XR |

FRANK L. ABBOTT, *Primary Examiner.*

PRICE C. FAW, *Assistant Examiner.*